Figure 1:
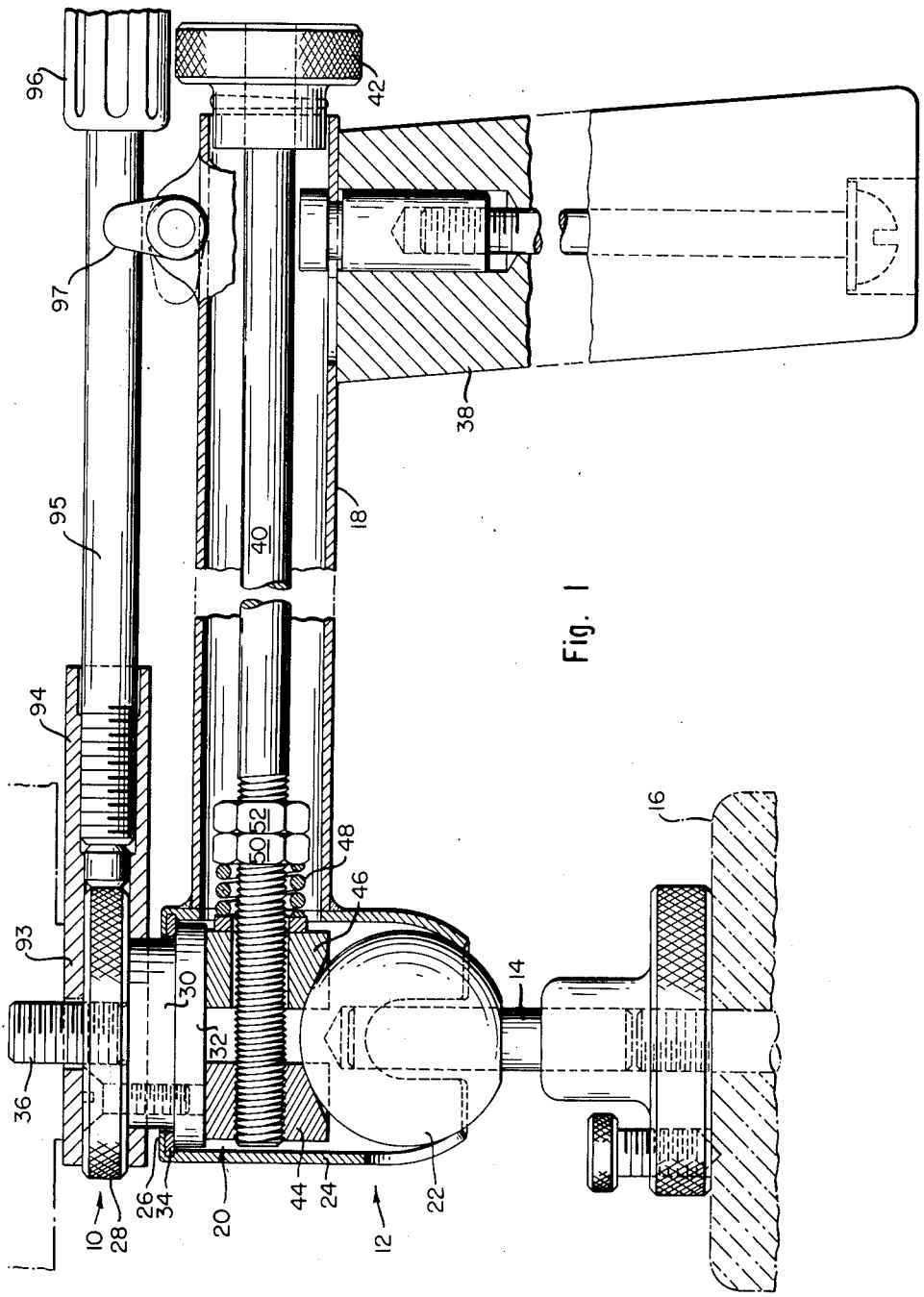

Jan. 25, 1955   N. C. POLLARD   2,700,523
PANHEAD FOR CAMERAS
Filed Feb. 10, 1953

INVENTOR.
Ned C. Pollard
BY
Kenway, Jenney, Witter & Hildreth
Attys.

United States Patent Office 2,700,523
Patented Jan. 25, 1955

2,700,523

PANHEAD FOR CAMERAS

Ned C. Pollard, Beverly, Mass.

Application February 19, 1953, Serial No. 336,100

4 Claims. (Cl. 248—181)

This invention relates to camera supports or panheads, and more particularly to panheads adapted both for aiming the camera and for locking the camera in an aimed position.

An important object of my invention is to provide a panhead in which means for providing universal directionality is combined with means for accurately aiming the camera and locking the camera in a given position of aim without requiring the operator to use two hands. Another object of my invention is to provide the locking arrangement for such a panhead with means for partially locking or permitting freedom of motion under varying degrees of restraint. Still another object of my invention is to provide the aiming mechanism of such a panhead with means for exerting a positive control over both the direction and attitude of the camera and to separate the aiming mechanism from the pivot point of the panhead so that controlling the aim of the camera may be accomplished without interfering with sighting the camera.

In accomplishing these and other objects of my invention in a preferred embodiment thereof, I provide a camera supporting platform mounted on the upper connection of a universal joint. The lower connection of the universal joint is in turn mounted on a stationary base such as a tripod. The camera is aimed by means of an operating arm which is connected to the said platform and is provided with a hand grip in a position on said arm substantially separated from the pivot point of the panhead. The universal joint is locked and holds the panhead in a fixed position by means of a locking mechanism located on said arm adjacent to the hand grip and communicating with the joint through the operating arm. Thus an operator may aim the camera with only one hand applied to the hand grip, and may lock the camera in position by using only a thumb or finger of that same hand. In this way, accurate aiming may be accomplished, and locking may be performed without even tending to disrupt the aim.

It is a feature of my invention that the hand grip is located on the operating arm at a point substantially separated from the pivot point of the panhead, thus providing ample leverage for controlling the aim of the camera. Furthermore, the hand grip is disposed at a substantial angle away from the axis of the operating arm in order to provide full control over the aim of the camera in all directions and attitudes.

Another feature of my invention relates more specifically to the locking mechanism one part of which operates to restrain the motion of the universal joint under spring pressure prior to arriving at a condition wherein the joint is completely locked in a fixed position. In this way accurate adjustment of aim may be accomplished.

Another feature of my invention, in one embodiment thereof, is the provision of means for turning the camera support platform relative to the operating arm together with means for locking the turning motion of said support platform at the same time as locking the universal joint. This feature permits the camera readily to be turned to a convenient position wherein the operating arm does not interfere with sighting the camera. It will be further noted in connection with this feature, that the previously mentioned preliminary spring pressure of the locking mechanism is sufficient to hold the camera supporting platform against turning while the panhead is being positioned. Thereafter, locking the universal joint also locks the platform from turning.

Further objects and features of my invention will best be understood and appreciated from a detailed description of a preferred embodiment thereof, selected for purposes of illustration, and shown in the accompanying drawings in which the figure is a sectional view in side elevation of one embodiment of my invention.

A preferred embodiment of my invention is illustrated in the figure and includes in its general organization a camera supporting platform indicated at 10, a universal joint indicated at 12 mounted on a pin 14 which is in turn mounted on a tripod or other stationary surface 16, an operating arm 18, and locking mechanism for said joint 12 indicated generally at 20. The universal joint 12 comprises a metallic ball 22 mounted on the pin 14 and a shell 24, the lower end of which forms a socket fitting partially around the ball 22. The upper end of the shell 24 encloses the locking mechanism indicated at 20, and is provided with an inwardly extending flange 26 which serves the purpose of retaining the camera supporting platform 10.

The camera supporting platform 10 comprises a knurled nut 28 mounted on a cylindrical plug 30 which is in turn mounted on a cylindrical retaining disk 32 of slightly larger diameter than the plug 30. The retaining disk 32 is located within the shell 24 and is retained therein by the flange 26 in the upper end thereof. An annular bushing 34 is mounted adjacent to the flange 26 in the shell 24 and serves to promote a free sliding contact between the retaining disk 32 of the camera supporting platform 10 and the shell 24. An upwardly extending threaded stem 36 is mounted centrally on the knurled nut 28 and serves the purpose of securing a camera to the said camera support platform 10.

The operating arm 18 is secured to one side of the shell 24 of the universal joint indicated at 12 and comprises a hollow metallic tube. A hand grip 38 is secured to the outer end of the operating arm 18 and extends downwardly therefrom at a substantial angle away from the axis of the said arm 18. Thus it will be seen that the attitude of the universal joint may be positively controlled in all angles by moving the operating arm around and by tilting the hand grip.

The locking mechanism 20 for the universal joint 12 comprises a longitudinally extending shaft 40 mounted within the operating arm 18 and having an exposed knurled nut 42 at the outer end thereof adjacent to the hand grip 38 so that the shaft 40 may be turned by means of a finger or thumb of the same hand which holds and operates the hand grip 38. Locking is accomplished by means of a wedge element 44 which is mounted on the inner end of the shaft 40 by means of suitable threaded engagement whereby turning the shaft 40 causes the wedge element 44 to be drawn against the upper surface of the ball 22 to clamp the same against motion relative to the shell 24. The upper surface of the wedge element 44 likewise bears against the under surface of the camera retaining member 32 such that wedging the element 44 against the ball 22 exerts a simultaneous wedging force against the retaining member 32 and accomplishes a double locking action. A second wedging element 46 is mounted on the shaft 40 on the opposite side of the ball 22 from the wedge element 44 and is urged against the ball 22 by a compression spring 48. The wedge element 46 slides freely on the shaft 40, and the spring 48 is buttressed along the shaft 40, by a nut 50 and locking nut 52. Thus it will be noted that the wedging element 46 exerts a restraining force against the motion of the universal joint by pressing against the ball 22, and likewise it presses upwardly against the camera platform retaining member 32 to similarly restrain its turning motion.

From the foregoing description, it will now be understood that the operation of the panhead of my invention is substantially as follows. The shaft 40 is turned by means of the knurled nut 42 completely to release the wedging elements 44 and 46. Thereafter a camera is positioned relative to the threaded element 36, and the camera supporting platform is turned until the camera is firmly mounted on the said supporting platform 10. Thereafter the nut 42 is turned to bring the wedge elements 44 and 46 into contact with the ball 22 and retaining member 32. Under this condition the spring 48 exerts a pressure against the wedge 46 which restrains, but does not limit, the turning motion of the universal joint or of the platform 10. At this point the camera may be aimed as desired by turning or tilting the operating arm 18, and the camera may be turned relative to the operating arm 18 to arrive at the most suitable sighting position relative to the said arm. When the exact point of aim has been arrived at, the operator may further tighten the wedging elements 44 and 46 simply by turning the nut 42 with a finger or thumb without having to use a second hand for such locking operation and without in any way disrupting the aim of the camera while locking.

The camera may be directly secured to the knurled nut 92, or, as in the figure, the knurled disk 28 may be enclosed between two forks 93 of a yoke 94 having an internally threaded stem 94. A rod 95 is threaded at its forward end for connection with the stem 94 and provided at its outer end with a fluted head 96 by which it may be conveniently turned to clamp or release the nut 28. A forked clip 97 is pivotally mounted on the tubular arm 18 and arranged to hold the rod 95 against angular movement when in its upright position as shown in the figure. When the clip is swung into its dotted position the rod is released and may be swung independently of the arm 18 so that the camera may be traversed from side to side. The vertical angle of the camera may thus be determined by movement about the axis of the ball 22 and thus a panoramic motion given it about the upright axis of the nut 28 and its stem 36. It will be understood that the spring 48 and wedging elements maintain a functional drag upon the movement of the camera while permitting its independent movement by manipulation of the rod 95.

Since minor variations of this preferred embodiment of my invention will now be apparent to those skilled in the art, it is not intended to confine this invention to the precise form shown herein, but rather to limit it in terms of the appended claims.

Having thus described and disclosed illustrative embodiments of my invention, what I claim as new and desire to secure by Letters Patent of the United States is:

1. A panhead for mounting a camera and aiming it relative to a stationary base, having in combination, a platform, means on said platform for securing a camera thereto, a universal joint mounted on said base and supporting said platform for universal motion, an operating arm connected to said platform, means for rotating said platform relative to said operating arm, a hand grip on said operating arm, locking means adjacent to said hand grip on said operating arm for locking simultaneously both the motion of said universal joint and of said camera-securing means and being adapted to operate independently of the position of said operating arm and hand grip.

2. A panhead for mounting a camera and aiming it relative to a stationary base, having in combination, a platform, means on said platform for securing a camera thereto, a universal joint mounted on said base and supporting said platform for universal motion comprising a ball mounted on said stationary base, and walls forming a socket adapted to fit partially around said ball in free sliding relation; an operating arm connected to said socket walls, a hand grip mounted on the outer end of said operating arm, locking means comprising a shaft communicating through said operating arm to said universal joint, opposed wedge elements and a compression spring on the inner end of said shaft tending at all times to contract the wedge elements upon the ball and an exposed nut on the outer end of said shaft adjacent to said hand grip, a threaded connection between one of said wedge elements and said shaft whereby turning said shaft draws said wedge elements against the ball of said universal joint, and said locking means adapted to operate independently of the position of the operating arm and hand grip.

3. A panhead for mounting and aiming a camera, comprising a base adapted to be secured to a tripod, a ball carried by the base, a cylindical casing partially enclosing the ball in its lower end, a disk enclosed in the upper end of the casing and having a threaded stem for connection with a camera, a pistol-grip arm extending from one side of the casing, spring operated clamping means in the casing for frictionally engaging the ball, and an operating rod extending from the casing through the pistol-grip arm for controlling the action of said clamping means on the ball and simultaneously upon said disk.

4. A panhead of the character described in claim 3 in which a yoke encloses the disk and has clamping means therefor, and also an operating arm that may be swung independently of the pistol grip arm.

References Cited in the file of this patent

UNITED STATES PATENTS

| | | |
|---|---|---|
| 2,524,473 | Pasturazak | Oct. 3, 1950 |
| 2,638,298 | Peterson | May 12, 1953 |

FOREIGN PATENTS

| | | |
|---|---|---|
| 618,296 | Great Britain | Feb. 18, 1949 |